(12) United States Patent
Koike (10) Patent No.: US 9,127,764 B2
(45) Date of Patent: Sep. 8, 2015

(54) GEAR FOR USE IN FISHING REEL

(71) Applicant: GLOBERIDE, Inc., Tokyo (JP)

(72) Inventor: Mamoru Koike, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 134 days.

(21) Appl. No.: 13/772,282

(22) Filed: Feb. 20, 2013

(65) Prior Publication Data

US 2013/0220050 A1    Aug. 29, 2013

(30) Foreign Application Priority Data

Feb. 23, 2012 (JP) ................................ 2012-036905

(51) Int. Cl.
| | |
|---|---|
| *F16H 55/14* | (2006.01) |
| *F16H 55/06* | (2006.01) |
| *A01K 89/00* | (2006.01) |
| *A01K 89/01* | (2006.01) |
| *A01K 89/015* | (2006.01) |

(52) U.S. Cl.
CPC ................ *F16H 55/06* (2013.01); *A01K 89/00* (2013.01); *A01K 89/01* (2013.01); *A01K 89/015* (2013.01); *F16H 55/14* (2013.01); *Y10T 74/19893* (2015.01)

(58) Field of Classification Search
CPC .... F16H 55/12; F16H 55/14; Y10T 74/19893
USPC .......................................... 74/446, 447, 439
See application file for complete search history.

(56) References Cited

U.S. PATENT DOCUMENTS

| | | | | |
|---|---|---|---|---|
| 2,932,207 | A | * | 4/1960 | Whitney ........................ 474/152 |
| 3,200,665 | A | * | 8/1965 | Wells .............................. 74/446 |
| 6,053,060 | A | * | 4/2000 | Tumberlinson et al. ......... 74/7 R |
| 6,148,685 | A | * | 11/2000 | Cadle et al. ..................... 74/457 |
| 6,343,418 | B1 | * | 2/2002 | Hitomi ....................... 29/893.35 |

FOREIGN PATENT DOCUMENTS

JP          10-150889          6/1998

OTHER PUBLICATIONS

Chinese Office Action dated Jun. 4, 2014 for Appln. No. 201310044960.3.
Chinese Office Action dated Nov. 14, 2014 for Appln. No. 201310044960.3.

* cited by examiner

*Primary Examiner* — William C Joyce
(74) *Attorney, Agent, or Firm* — Pillsbury Winthrop Shaw Pittman, LLP (57) ABSTRACT

One object is to provide a gear to be included in a fishing reel to produce excellent rotation feeling while reducing the weight relative to the strength. In accordance with one aspect, a drive gear included in a fishing reel is formed of a circumferential part having tooth surfaces and a body part radially inside the circumferential part which are made of different materials and integrated together. These materials satisfy the following conditions: S1>S2, P1>P2, and F1<F2, where S1 and S2 represent material strengths, P1 and P2 represent material densities (specific gravities), and F1 and F2 represent vibration damping capacities for the circumferential part and the body part, respectively.

2 Claims, 6 Drawing Sheets

GEAR FOR USE IN FISHING REEL

CROSS-REFERENCE TO RELATED APPLICATIONS

This application is based on and claims the benefit of priority from Japanese Patent Application Serial No. 2012-36905 (filed on Feb. 23, 2012), the contents of which are hereby incorporated by reference in its entirety.

TECHNICAL FIELD

The present invention relates to a gear for use in a fishing reel.

BACKGROUND

In general, a fishing reel includes a power transmission mechanism for transmitting rotational drive force of a handle to a spool around which a fishing line is wound. Such a power transmission mechanism includes various gears. As disclosed in, for example, Japanese Patent Application Laid-open No. Hei 10-150889 (the "'889 Publication"), the performance of a gear has recently been improved in accordance with the property required for a reel and the position where the gear is used.

The '889 Publication is directed to a weight reduced face gear unrotatably secured to a handle shaft so as to improve the casting performance of a spinning reel. The weight of the disclosed face gear may be reduced while retaining the strength and accuracy thereof. More specifically, the disclosed face gear is formed of a disk part and a tooth part made of different materials: the disk part is made of an aluminum alloy that permits weight reduction, and the tooth part is made of a zinc alloy or a high-strength synthetic resin that retains strength and accuracy.

In the '889 Publication, since the circumference of the gear (face gear) is formed by outsert molding a zinc alloy or a high-strength synthetic resin on the disk part serving as a substrate, the resulting gear has limited accuracy and is defective in strength and durability. The low strength requires a larger size of the entire gear and thus prevents downsizing and increases the weight. Additionally, a gear having a tooth part and a substrate made of different materials for weight reduction is defective in rotation feeling of the handle because the vibration and the rotation performance are largely affected by the combination of the materials.

SUMMARY

The present invention addresses the above defects and provides a gear for use in a fishing reel that may produce excellent rotation feeling while reducing the weight relative to the strength.

In accordance with one aspect of the present invention, a gear included in a fishing reel comprises a circumferential part having tooth surfaces and a body part radially inside the circumferential part. The body part may be integrated with the circumferential part. In one aspect. the circumferential part and the body part are made of different materials. These materials satisfy the following conditions: S1>S2, P1>P2, and F1<F2, where S1 and S2 represent material strengths, P1 and P2 represent material densities (specific gravities), and F1 and F2 represent vibration damping capacities for the circumferential part and the body part, respectively.

In the above gear, the circumferential part including the tooth surfaces has a higher material strength and a higher material density (a higher specific gravity) than the body part; therefore, the gear part including the tooth surfaces is strengthened while reducing the overall weight of the gear, thereby balancing the weight reduction and strength improvement of the gear part. Simultaneously, the body part is formed of a material having a higher vibration damping capacity than the circumferential part, and thus the body part can damp the vibration produced in the tooth surfaces when the drive gear is rotating in mesh with another gear; and additionally, the difference in specific gravity keeps a high moment of inertia. Accordingly, a hand rotating the handle 13 feels uniformly smooth.

The present invention provides a gear for use in a fishing reel that may produce excellent rotation feeling while reducing the weight relative to the strength.

DESCRIPTION OF EXAMPLE EMBODIMENTS

Example embodiments of a fishing reel according to the present invention will be described below. The following embodiments provide examples of a drive gear mounted on a handle shaft to transmit power while generating a desired friction against a drag mechanism. In one example, the drive gear is used in a double bearing reel for fishing.

Figure 1:
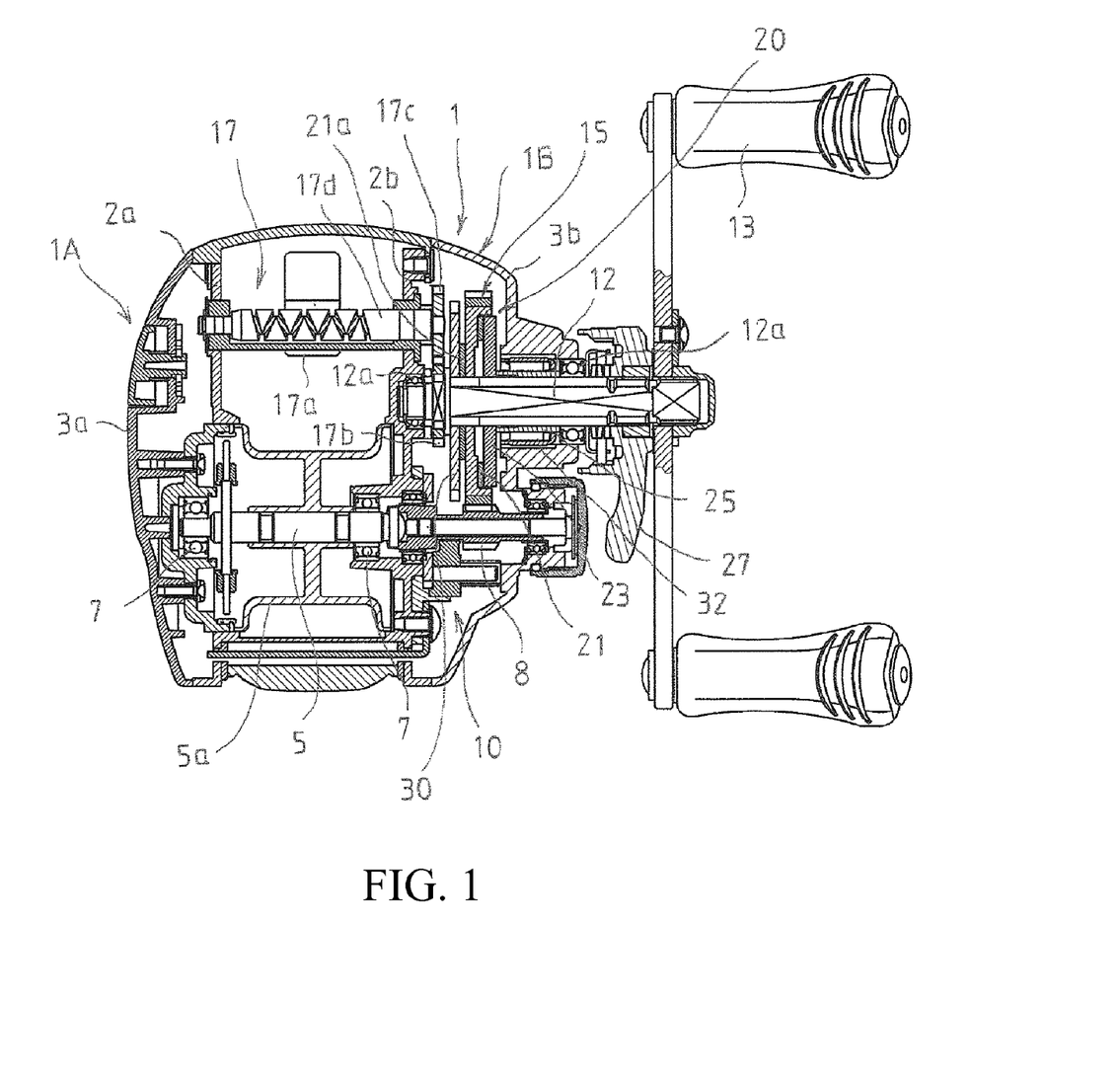
FIG. 1 shows an internal structure of a double bearing reel according to an embodiment of the fishing reel of the present invention.
Figure 2:
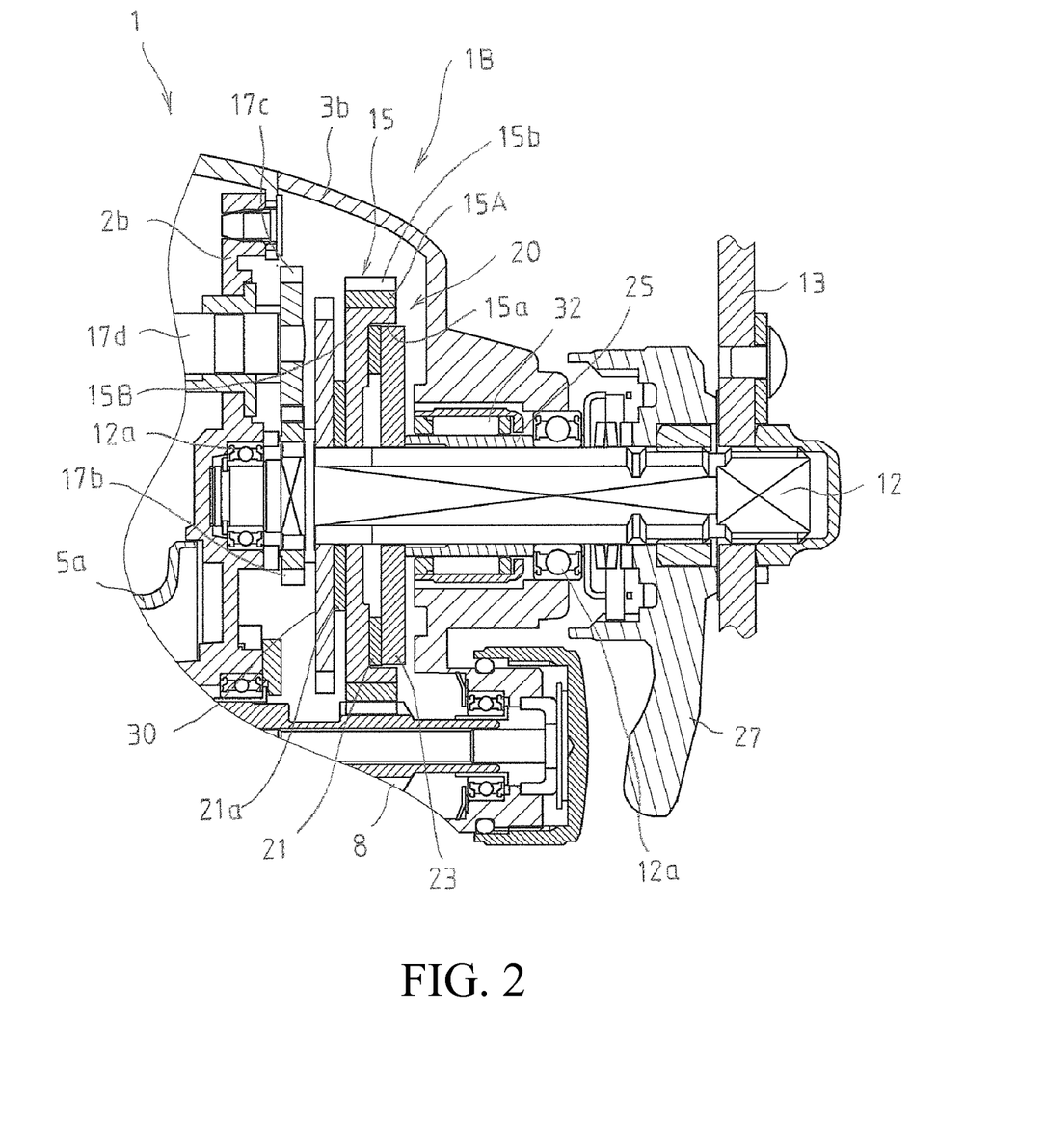
FIG. 2 is an enlarged diagram showing a handle shaft portion in FIG. 1.
Figure 3A:
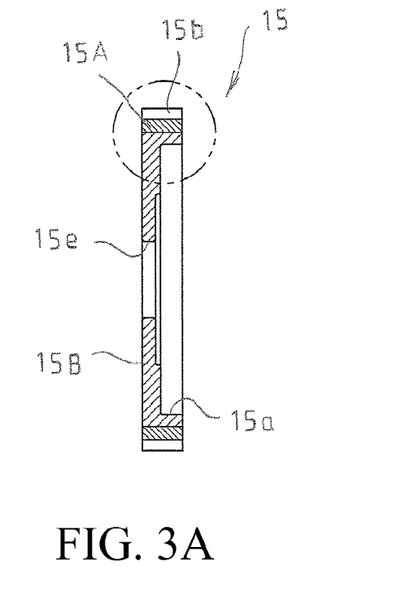
FIG. 3A is a sectional view of a drive gear.
Figure 3B:
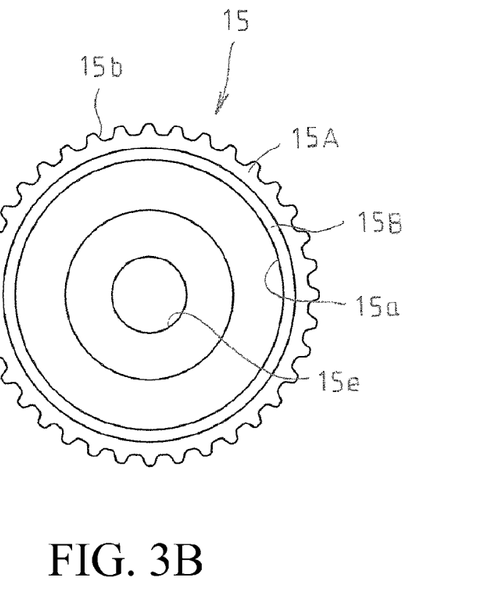
FIG. 3B is a plan view of the drive gear.
Figure 4:
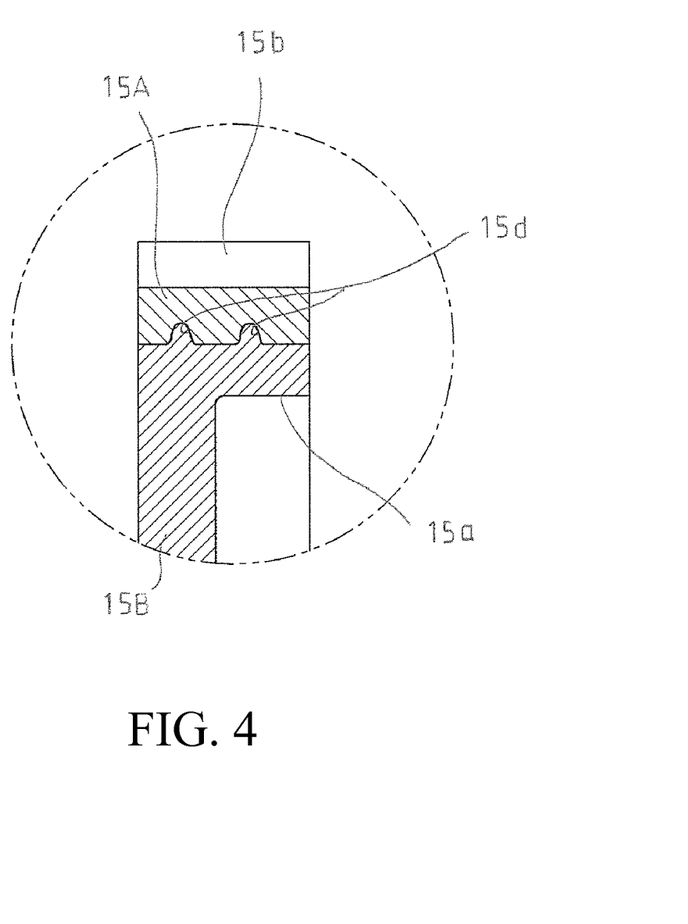
FIG. 4 is an enlarged diagram of FIG. 3A.

FIGS. 1 to 4 show an embodiment of such a double bearing reel FIG. 1 shows an internal structure of the double bearing reel; FIG. 2 is an enlarged diagram showing a handle shaft portion in FIG. 1; FIG. 3A is a sectional view of a drive gear and FIG. 3B is a plan view of the drive gear; and FIG. 4 is an enlarged diagram of FIG. 3A.

The reel body 1 of the double bearing reel including a drive gear according to the illustrated embodiment comprises side plates 1A and 1B. The side plate 1A includes left frame 2*a* and left cover 3*a* covering the left frame 2*a*. The side plate 1B includes right frame 2*b* and right cover 3*b* covering the right frame 2*b*. Between the side plates (or the left and right frames), a spool shaft 5 is rotatably supported via bearings 7. The spool shaft 5 is integrally provided with a spool 5*a* around which a fishing line is to be wound.

Mounted on one end of the spool shaft 5 projecting beyond the right frame 3*b* is a pinion gear 8. The pinion gear 8 may be made of brass and be movable along the axial direction of the spool shaft 5. The pinion gear 8 can be moved by a known clutch mechanism 10 between an engagement position where the pinion gear 8 engages with the spool shaft 5 and rotates integrally with the spool shaft 5 (power transmitting state (see FIG. 1)) and a non-engagement position where the pinion gear 8 is disengaged from the spool shaft 5 (power cutoff state). Additionally, the pinion gear 8 meshes with a drive gear 15 rotatably mounted on a handle shaft 12 The handle shaft 12 is rotatably supported by the right side plate 1B via bearings 12*a*. A handle 13 is mounted on one end of the handle shaft 12. When the handle 13 is rotationally operated, the power is transmitted through the handle shaft 12, the drive gear 15, and the pinion gear 8 to the spool shaft 5, resulting in rotation of the spool shaft 5 and the spool 5*a*. The drive gear 15 rotatably mounted on the handle shaft 12 receives a desired braking force from a drag mechanism 20, which is further described later.

Installed between the left and right side plates in front of the spool 5a is a level wind mechanism 17 comprising a line guide 17a for admitting and guiding a fishing line. The line guide 17a is engaged with a worm shaft 17d to be rotated via a gear 17b and an input gear 17c. The gear 17b is provided on the proximal end of the handle shaft 12 and the input gear 17c is supported by the right frame. When the handle 13 is rotationally operated, the worm shaft 17d is rotated via the gear 17b and the input gear 17c to reciprocate the line guide 17a engaged therewith between the left and right side plates. Thus, when the handle 13 is rotationally operated, the spool 5a is rotated as described above and the line guide 17a is driven in synchronization, so that the fishing line is uniformly wound around the spool 5a.

Between the handle shaft 12 and the drive gear 15 is installed a drag mechanism 20 that provides a desired braking force to the rotating spool 5a when for example the fishing line is drawn out by a caught fish.

The drag mechanism 20 in the illustrated embodiment comprises: a lining member 21 shaped in a ring so as to be accommodated in an annular recess 15a formed in a surface of the drive gear 15 opposed to the handle; and a drag washer 23 in surface contact with the lining member 21 and holding the lining member 21 in the annular recess 15a. The drag washer 23 is pressed against the drive gear 15 by a pressing member 25 slidable along the handle shaft 12. The lining member 21 is disposed freely rotatably around the handle shaft 12. The drag washer 23 is configured to have a non-circular inner hole shape conforming to the sectional shape of the handle shaft 12 so as to be movable in an axial direction of the handle shaft 12 and to rotate integrally with the handle shaft 12. Thus, the drag washer 23 is disposed in an unrotatably secured state. A unidirectional clutch 32 is configured to prevent reverse rotation of the handle shaft 12. The pressing member 25 may be integrated with the unidirectional clutch 32 such that it forms an inner wheel member of the unidirectional clutch 32.

A drag operation member 27 is rotatably provided on the handle shaft 12 and adjacent to the handle 13. The pressing member 25 is moved toward the drive gear 15 when the drag operation member 27 is rotationally operated such that the pressing member 25 presses the lining member 21 through the drag washer 23. As a result, a friction occurs between the lining member 21 and the drag washer 23 rotating integrally with the handle shaft; and thus a drag force (braking force) is applied to the rotating drive gear 15 while it rotates around the handle shaft 12. More particularly, with the drag operation member 27 loosely squeezed, the drive gear 15 may slip relative to the handle shaft 12 while receiving a friction applied by the lining member 21 when the spool 5a rotates in the direction to let out the fishing line upon, for example, catching a fish. Thus the spool 5a may rotate while receiving a braking force, preventing the fishing line from breaking even when receiving a sudden load.

The drag mechanism 20 of the illustrated embodiment includes a rotator 30 rotatable integrally with the handle shaft 12 on the opposite side of the drive gear 15. The rotator 30 functions as a ratchet for preventing the handle shaft 12 from rotating reversely when the unidirectional clutch 32 slips. A friction also occurs between such rotator 30 and the drive gear 15 via a lining member 21a.

The drive gear 15 is formed of two integrated parts: a circumferential part 15A tooth surface and a body part 15B. The circumferential part 15A may include tooth surfaces 15b. The body part 15B may be positioned radially inside the circumferential part 15A and adjacent to the lining member 21. The circumferential part 15A and the body part 15B are formed of different materials. These materials satisfy the following conditions: S1>S2, P1>P2, and F1<F2, where S1 represents a material strength of the circumferential part 15A and S2 represents a material strength of the body part 15B, P1 represents a material density (specific gravity) of the circumferential part 15A and P2 represents a material density of the body part 15B, and F1 represents a vibration damping capacity for the circumferential part 15A and F2 represents a vibration damping capacity for the body part 15B.

The above material strength represents the strength of a material itself (e.g., a strengths after heat treatment or working); and in particular, the material strength is determined by the maximum tensile loads endured by test pieces of the material loaded with a tensile stress (tensile strength). The above vibration damping capacity is determined by hammering in accordance with "JISG0602: Test methods for vibration-damping property in laminated damping steel sheets of constrained type."

In one particular embodiment, the circumferential part 15A may be formed of brass (C2600) and the body part 15B may be formed of an aluminum alloy (A5056), which is a different material from brass. As shown in the table described later, the material strength and the material density (specific gravity) are higher in the circumferential part 15A, and the vibration damping capacity is higher in the body part 15B.

In the double bearing reel according to the illustrated embodiment, the drag washer 23 and the handle shaft 12 are preferably formed of an aluminum alloy (A5056) as is the body part 15B. Also, the rotator 30 is preferably formed of an aluminum alloy as are the body part 15B, the handle shaft 12, and the drag washer 23.

In the above drive gear 15, the circumferential part 15A including the tooth surfaces 15b has a higher material strength and a higher material density (a higher specific gravity) than the body part 15B. Accordingly, the gear part (i.e., the circumferential part 15A) is strengthened while reducing the overall weight of the gear 15 compared to a gear entirely formed of a high strength material, thereby balancing the weight reduction and strength improvement of the gear part. Particularly, in the double bearing reel according to one embodiment, the improved strength of the gear part prevents the reduction in slidability of the pinion gear 8 slidable along the spool shaft. Additionally, since the pinion gear 8 and the tooth surfaces 15b of the drive gear are formed of similar materials, the both wear similarly to achieve a long-term stable operation with reduced risk of electrolytic corrosion.

Additionally, the body part 15B, formed of a material having a higher vibration damping capacity than the circumferential part 15A, can damp the vibration produced in the tooth surfaces 15b when the drive gear is rotating in mesh with the pinion gear 8. Further, the difference in specific gravity keeps a high moment of inertia, and therefore, microvibration and clinking noise produced between the drive gear 15 and the pinion gear 8 meshing together can be effectively absorbed by the body part 15B formed of a material having a high vibration damping capacity. The microvibration and clinking noise also can be suppressed by a force produced by the sustained high moment of inertia and keeping the drive gear 15 in a stable trajectory. Thus, a uniformly smooth feeling of rotation of the handle 13 can be provided. For a drive gear in a double bearing fishing reel according to the illustrated embodiment, a sustained high moment of inertia provides the above uniformly smooth rotation feeling and excellent flip handle performance. In one embodiment, a reel that keeps the handle rotating longer is evaluated to have better flip handle performance. The flip handle performance may be determined in store for example, by the duration that a handle keeps rotating after the handle is once flipped in the winding direction.

Furthermore, in the illustrated embodiment, the above gear is used as the drive gear 15 of the double bearing reel; and the body part 15B of the drive gear 15, the drag washer 23, and the rotator 30 adjoining are formed of an aluminum alloy, thereby reducing the overall weight. In addition, the drag washer 23 and the rotator 30 for holding the lining members 21 and 21a in cooperation with the body part 15B are formed of the same material, thereby stabilizing the drag performance at a desired level. Furthermore, since all of these parts are formed of the same material, these parts are less prone to electrolytic corrosion and have improved durability. That is, the illustrated embodiment can provide a double bearing reel well balancing the weight reduction, stabilization of drag performance, and strength improvement of the gear part. In one embodiment, the drag mechanism does not have the lining member 21a between the drive gear 15 and the rotator 30. In this case, the body part 15B of the drive gear and the drag washer 23 may be formed of an aluminum alloy to reduce the weight and stabilize the drag performance.

The above drive gear 15 may be fabricated in the following process for example.

The circumferential part 15A is formed of brass into a ring shape, and the body part 15B is formed of an aluminum alloy into a circular column shape. Then, the body part 15B shaped in a circular column is pressed into the hole of the circumferential part 15A, and is radially pressure-spread to integrate with the circumferential part 15A. To this end, the inner diameter of the circumferential part 15A and the outer diameter of the body part 15B may be determined so that, when the body part 15B is pressed into the hole of the circumferential part 15A, the body part 15B can be radially spread and pressure welded to the inner surface of the hole. With cavities 15d formed in the inner circumferential surface of the circumferential part 15A as shown in FIG. 4, the circumferential part 15A and the body part 15B may be firmly jointed and integrated with one another by plastic deforming the body part 15B and caulking the body part 15B to the cavities 15d when pressed into the circumferential part 15A The lower yield strength makes the body part 15B more prone to plastic deformation during pressing. In one embodiment, the body part 15B is preferably made of a material having a lower yield strength than the circumferential part 15A to form the drive gear 15. It should be noted that the positions and shape of the cavities 15d are not limited to the above-described embodiment, and rahther these cavities may be formed along the circumference or may be formed along the circumference at a constant pitch. The thus formed cavities with a constant pitch may prevent the body part 15B from coming off and also prevent the two members from rotating circumferentially relative to each other.

Next, the disk-like member formed of the integrated circumferential part 15A and body part 15B is subjected to the following machining process. The machining process includes forming of a hole 15e to be penetrated by the handle shaft 12 in the body part 15B of the integrated disk-like member, forming of the tooth surfaces 15b in the circumferential surface of the circumferential part 15A, and forming of the annular recess 15a in the body part 15B.

Thus, the tooth surfaces 15b is formed after the body part 15B is pressed into the circumferential part 15A for integration, a drive gear 15 having a high strength and a reduced overall weight may be accurately and readily fabricated. Further, as described above, since a plurality of cavities 15d are formed to caulk the circumferential part 15A the body part 15B, the interface between the two members is indented and thereby enhances the vibration damping effect. It should be noted that even when a single cavity 15d is formed, the increased surface area of the interface can provide vibration damping effect.

In addition to the above pressing method, the drive gear 15 may also be fabricated by, for example, impact molding the body part 15B into the circumferential part 15A for integration. Alternatively, the drive gear 15 may be fabricated as shown in FIGS. 5 and 6, which show another embodiment of the drive gear.

Figure 5A:
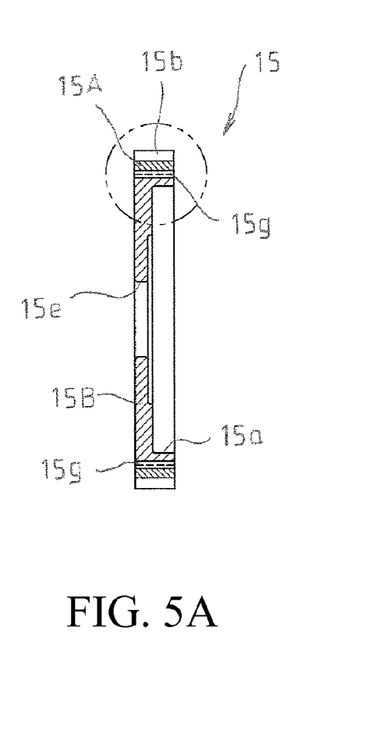
FIG. 5A is a sectional view of another drive gear.
Figure 5B:
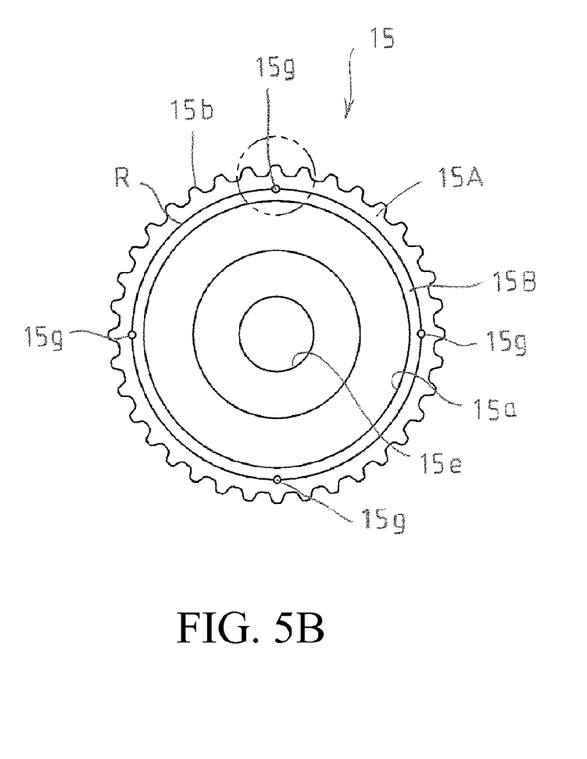
FIG. 5B is a plan view of the other drive gear.
Figure 6A:
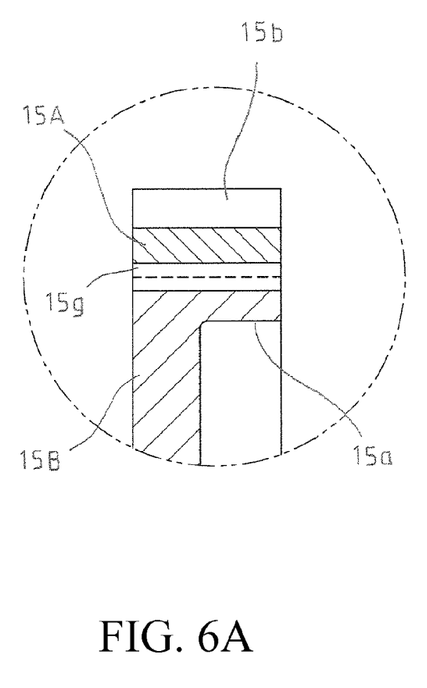
FIG. 6A is an enlarged diagram of FIG. 5A.
Figure 6B:
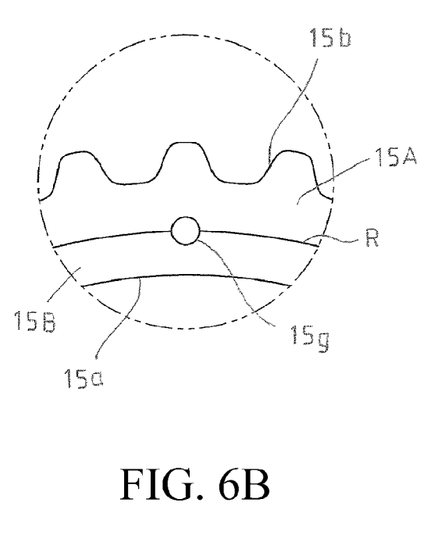
FIG. 6B is an enlarged diagram of FIG. 5B.

In the embodiment as shown in FIGS. 5 and 6, through holes 15g are formed in the boundary part R between the circumferential part 15A and the body part 15B when brass is shaped into a ring and an aluminum alloy is shaped into a circular column as in the embodiments shown in FIGS. 3 and 4. The through holes 15g may be configured so as to accommodate binding members (not shown) therein. In this embodiment, each of the through holes 15g is formed by mating two elongated grooves having semicircular sections: one formed axially in the inner circumferential surface of the circumferential part 15A shaped in a ring, and the other formed axially in the outer surface of the body part 15B shaped in a circular column. A plurality of such through holes 15g are formed circumferentially (in FIG. 5, four through holes are formed at intervals of 90°). After integrating the two members, each through hole 15g is filled with a pin used as a binding member and/or an adhesive so as to bind the two members. The pin is preferably made of metal and to be processed for prevention of coming off after being fitted into the through hole. Then, as described above in connection with the embodiment shown in FIGS. 3A and 3B, the disk-like member formed by integrating the circumferential part 15A the body part 15B is subjected to a machining process, thereby accurately fabricating a drive gear having strong tooth surfaces and a reduced weight.

The above method of fabricating a drive gear 15 is a mere example; and the above techniques of press fitting, caulking, fitting of pins, and adhesion may be combinedly used.

Table 1 below shows the actual test results of a double bearing reel including a drive gear according to the present invention and a double bearing reel including a conventional drive gear compared in terms of weight reduction, durability (durability of the drive gears), rotation feeling, and flip handle performance. In the table, the symbols "⊚," "○," "△," and "X" represent "excellent," "good," "unsatisfactory," and "poor" results, respectively.

In Conventional Examples 1 and 2, drive gears were each formed of a single material: an aluminum alloy (A5056) for overall weight reduction in Conventional Example 1, and brass (C2600) for strengthening the tooth surfaces in Conventional Example 2. In Conventional Example 3, the gear was formed of two parts integrated together as in the present invention, wherein the circumferential part 15A was formed of a zinc alloy (ZDC1), and the body part 15B was formed of an aluminum alloy (A5056).

In contrast, in accordance with some embodiments of the present disclosure Embodiment 1 was formed of an circumferential part 15A made of brass (C2600) and a body part 15B made of an aluminum alloy (A5056) integrated together; Embodiment 2 was formed of an circumferential part 15A made of an titanium alloy (6Al-4V-Ti) and a body part 15B made of an aluminum alloy (A6061) integrated together; Embodiment 3 was formed of an circumferential part 15A made of stainless steel (SUS304) and a body part 15B made of an aluminum alloy (A5056) integrated together; and Embodiment 4 was formed of an circumferential part 15A made of brass (C2600) and a body part 15B made of a magnesium alloy (AZ91) integrated together. All of these Embodiments were prepared so as to satisfy the above relations for strength, material density, and vibration damping capacity

TABLE 1

| | | | Material Characteristics | | | | Evaluation | | | | |
|---|---|---|---|---|---|---|---|---|---|---|---|
| | | | Tensile Strength MPa | Yield Strength MPa | Specific Gravity (Density) | Vibration Damping Capacity (%) | Weight Reduction | Durability | Rotation Feeling | Flip Handle | Overall Evaluation |
| Conventional Example 1 | Circumference Body | A5056 in one piece | 235 | 175 | 2.7 | 2 | ◎ | X | Δ | X | Δ |
| Conventional Example 2 | Circumference Body | C2600 in one piece | 420 | 300 | 8.43 | 0.2 | X | ◎ | Δ | ◎ | Δ |
| Conventional Example 3 | Circumference Body | ZDC1 A5056 | 325 235 | 200 175 | 6.6 2.7 | 20 2 | ○ | ○ | X | ◎ | Δ |
| Embodiment 1 | Circumference Body | C2600 A5056 | 420 235 | 300 175 | 8.43 2.7 | 0.2 2 | ○ | ◎ | ◎ | ◎ | ○ |
| Embodiment 2 | Circumference Body | 6Al—4V—Ti A6061 | 980 310 | 890 275 | 4.4 2.7 | 0.2 2 | ◎ | ◎ | ○ | ◎ | ○ |
| Embodiment 3 | Circumference Body | SUS304 A5056 | 450 235 | 205 175 | 7.8 2.7 | 1.5 2 | ○ | ◎ | ○ | ◎ | ○ |
| Embodiment 4 | Circumference Body | C2600 AZ91 | 420 240 | 300 140 | 8.43 1.8 | 0.2 60 | ◎ | ○ | ◎ | ○ | ○ |

This comparison test reveals that weight reduction and improvement of durability, rotation feeling, and flip handle performance can be achieved in a good balance in a double bearing reel including a drive gear in which a circumferential part having tooth surfaces has higher material strength and material density (specific gravity) than a body part and the body part has higher vibration damping capacity than the circumferential part. A drive gear made of a single material is inferior in durability and weight reduction as demonstrated by Conventional Examples 1 and 2, and a drive gear made of composite materials is also inferior in rotation feeling if the body part has lower vibration damping capacity as demonstrated by Conventional Example 3.

Embodiments of the present invention are not limited to the above descriptions and the above-described embodiments are susceptible to various modifications. For example, while the above-described gear can be suitably used as a drive gear in a double bearing reel to achieve the above-mentioned advantageous effects, the gear can also be applied to any power transmission mechanism cooperating with a rotating handle in various fishing reel such as a spinning reel. The circumferential part 15A corresponds to a part including tooth surfaces 15b, but the thickness thereof is not limited to a specific thickness.

What is claimed is:

1. A gear for use in a fishing reel, comprising:
   a circumferential part having toothed surfaces and an inner circumferential surface in which cavities are formed; and
   a body part positioned radially inside the circumferential part and integrated with the circumferential part,
   wherein the circumferential part and the body part are made of differing metal alloy materials,
   wherein the body part is shaped in a circular column and the circumferential part is shaped as a ring,
   wherein the metal alloy materials satisfy the following conditions: S1>S2, P1>P2, and F1<F2, where S1 and S2 represent material strengths, P1 and P2 represent material densities (specific gravities), and F1 and F2 represent vibration damping capacities for the circumferential part and the body part, respectively, and
   wherein the metal alloy material of the body part has a lower yield strength than the circumferential part, so as to caulk the body part to the cavities such that the body part is integrated with the circumferential part by pressing the body part into the circumferential Part.

2. The gear for use in a fishing reel according to claim 1, wherein the body part is integrated with the circumferential part by pressing the body part into the circumferential part before the tooth surfaces are formed.

* * * * *